UNITED STATES PATENT OFFICE.

HENRI TERRISSE, OF VERNIER, NEAR GENEVA, SWITZERLAND, ASSIGNOR, BY MESNE ASSIGNMENTS, TO FABRIQUE DE VERNIS ET PRODUITS CHIMIQUES (SOCIÉTÉ ANONYME), OF VERNIER, SWITZERLAND, A CORPORATION OF SWITZERLAND.

TREATMENT OF HARD AND SEMI-HARD COPALS AND THE PREPARATION OF VARNISHES.

No. 883,842.   Specification of Letters Patent.   Patented April 7, 1908.

Application filed October 29, 1907. Serial No. 399,764.

*To all whom it may concern:*

Be it known that I, HENRI TERRISSE, chemist, a citizen of the Confederation of Switzerland, residing at Vernier, near Geneva, Switzerland, have invented certain new and useful Improvements in and Relating to the Treatment of Hard and Semi-Hard Copals and the Preparation of Varnishes, of which the following is a specification.

My invention relates to a method of dissolving hard and semi-hard copals in siccative oils without previously melting the copals, and to the preparation of varnishes from the products so obtained.

Several patents granted by countries foreign to the United States (for example, French Patent No. 344,300; Belgian Patent No. 178,072; German Patent No. 165,008; and British Patent No. 14,554 of 1903) disclose a method of dissolving hard and semi-hard resins in siccative oils, which method consists in first dissolving the resins in naphthalene under pressure, then adding oil to the solution so produced and heating again under pressure. This method is very good but has, nevertheless, the following serious drawbacks: First: By heating oil under pressure, it is always decomposed; and this decomposition is serious in its results. Second: Because of this decomposition, distillation under vacuum is necessary to remove the fatty acids which have been formed. Third: If the oil is not introduced under pressure, the resins very readily coagulate, when the naphthalene is removed. Fourth: Although one works at relatively low temperatures, nevertheless heating up to 290° C. is required. Fifth: The distillation must always be performed with great care after the oil has been heated under pressure, as the heated liquid foams a great deal. In the method hereinafter described all these drawbacks are avoided, since the reactions are very simple. Instead of using the naphthalene alone, a mixture of this substance with resin oil or with copal oil in different proportions is used. This mixture may, for instance, consist in two parts of naphthalene and one part of one or the other of these two oils.

Neither the resin oil alone nor the copal oil dissolves easily the resins, when these oils are each used alone as a solvent. The copal oil would give better results, if there did not exist the difficulty of removing it, which requires raising the temperature to a very high point (340° C. to 360° C.) These oils mixed with the naphthalene are carried out of the alembic by the vapors of the naphthalene and may be therefore withdrawn between 270° C. and 280° C., the temperatures at which the varnishes are cooked.

The above described mixture dissolves without the use of pressure the Manila copals and the Kauri copals and also certain kinds of Congo resin. For dissolving the resins from Congo, Cameroon, Angola, Benguela, Acra, Sierra Leone, Brazil, Madagascar, Kiseel, Zanzibar, etc., they must be heated with the above described naphthalene-and-oil mixture at temperatures of 240° C. to 265° C. and at pressures varying from one and one-half to two and one-half atmospheres. These solutions, which are obtained very quickly by using this method, are very pale.

The following examples of my new method are given:

*First example.*—Into a still provided with a stirring device are introduced 200 kilograms of naphthalene; 100 kilograms of resin oil; and 100 kilograms of Manila copal. The whole is heated to boiling, which takes place at 215° C.; at this moment, all the resin is dissolved. The mixture of naphthalene and resin oil is distilled until the temperature of the interior of the distilling apparatus reaches 280° C. Then 100 kilograms of linseed-oil are added in small quantities at a time and one must take care that after each addition the temperature rises to 280° C.; the lid is lifted and heating is carried on for about half an hour, while stirring the liquid. The last traces of naphthalene and resin oil are removed at the end of this time. The varnish is completed by adding a new supply of oil, if necessary, and spirit of turpentine and siccative.

*Second example.*—Into an autoclave boiler provided with a stirring device are introduced 200 kilograms of naphthalene; 100 kilograms of copal oil; and 100 kilograms of Zanzibar copal. The whole is heated for one hour at a temperature of 265° C. and at a pressure of from two to two and a half atmospheres. At the end of this time the solution is completed. This solution is then poured into a still and the process completed as in the first example.

The principal advantages of this process are the following: First: The temperature of solution of the resins is reduced by about 40° C; from which it results that the resins are much less decomposed by using the present method than by using the method described in the above mentioned patents. Second: No vacuum distillation is required. Third: No foam is produced during the distillation. Fourth: No heating the oil under pressure is required. Fifth: There is a saving of time and fuel.

I claim:

1. A step in the herein described process for the preparation of varnish consisting in heating a mixture of naphthalene, oil and a resin until the resin is dissolved; and then boiling the solution so produced to remove the naphthalene and oil.

2. A step in the herein described process for the preparation of varnish consisting in heating a mixture of naphthalene, oil and a resin until the resin is dissolved; boiling the solution so produced to remove the naphthalene and oil; and adding linseed oil, while maintaining the mixture at a temperature of about 280° C.

3. The herein described process for the preparation of varnish consisting in heating a mixture of naphthalene, oil and a resin, until the resin is dissolved; boiling the solution so produced to remove the naphthalene and oil; adding linseed oil, while maintaining the mixture at a temperature of about 280° C; and, lastly, adding spirits of turpentine and a siccative.

In testimony whereof I have affixed my signature in presence of two witnesses.

HENRI TERRISSE.

Witnesses:
L. H. MINIER,
R. DE WURTTEMBERGER.